Jan. 12, 1971   J. E. TARANTINO   3,554,590
FERRULE FOR FISHING RODS AND THE LIKE
Filed April 23, 1968
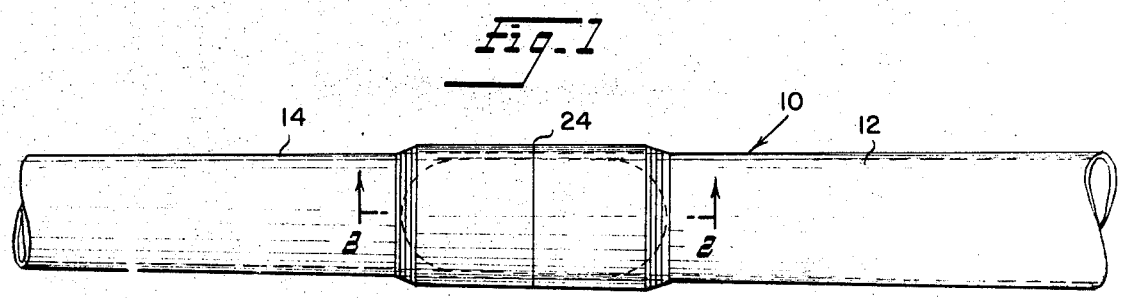
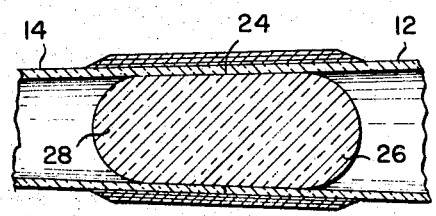
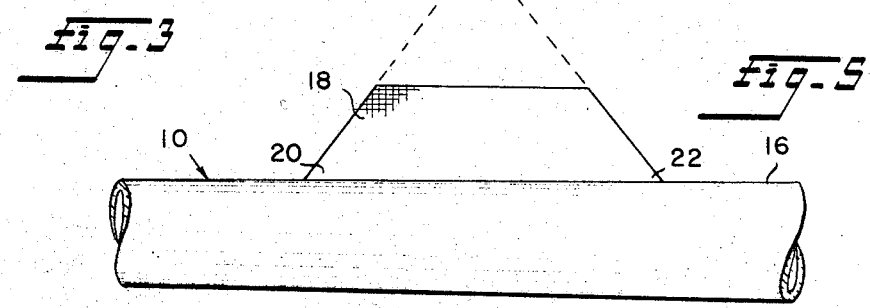
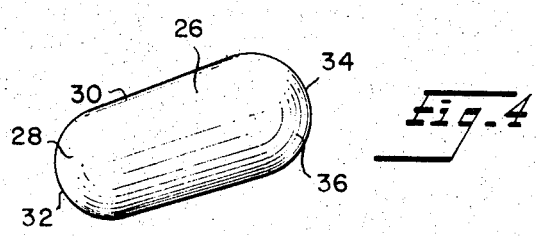
INVENTOR
Jon E. Tarantino
BY  Dean Lawrence
ATTORNEY

United States Patent Office 3,554,590
Patented Jan. 12, 1971

1

3,554,590
FERRULE FOR FISHING RODS AND THE LIKE
Jon E. Tarantino, San Francisco, Calif., assignor to The Compleat Angler, Ltd., San Francisco, Calif.
Filed Apr. 23, 1968, Ser. No. 723,548
Int. Cl. F16d 1/00
U.S. Cl. 287—127                                                    2 Claims

ABSTRACT OF THE DISCLOSURE

The present invention provides a method of making a ferrule or a joint for fishing rods and the like for a fishing rod comprised of at least two sections or separate parts in which a trapezoidal shaped reinforcement is wrapped around the outside of a rod blank of tubular configuration which forms the tip section and the butt section of the fishing rod. Thereafter, the wrapped around reinforcement section and the tubular rod blank are cured at the same time and become an integral piece. The rod blank is then cut into two pieces in the center of the reinforced area around which is wrapped the reinforcement. The rod blank is made of fiberglass and the reinforcement is made of fiberglass and a solid bar of fiberglass forming a plug is inserted within the reinforced section.

---

The present invention relates to a method for forming a joint for fishing rods and the like including a method of forming the joint.

It is an object of the present invention to provide a joint or a ferrule for a hollow fiberglass tubular fishing rod which will not cause the tubular rod member to crush and the ferrule to break.

It is yet another object of the present invention to provide a fiberglass reinforcement member that is wrapped around a hollow fiberglass tubular blank and secured thereto which reinforcement member is cut across the grain of the fiberglass cloth from which it is made so that the majority of fibers in it extend around the rod blank or substantially transversely of it, when wrapped around it, and substantially transversely of the longitudinal axis of the rod blank to give it more strength.

It is another object of the present invention to provide a joint or ferrule for a two-section fiberglass tubular fishing rod which does not use a metal bar or plug, which metal bar or plug generally causes the plug to split out of the tubular fiberglass section of the fishing rod.

It is yet another object of the present invention to provide a ferrule for a two-section fiberglass tubular fishing rod having a plug made of a solid bar of fiberglass which provides sufficient flexibility at the joint or ferrule in the fishing rod while at the same time providing the necessary compression strength of a solid bar of fiberglass.

It is yet another object of the present invention to provide a solid bar fiberglass member for insertion in a fiberglass tubular fishing rod which solid bar plug has rounded ends so that the stress is not focused at the ends of the plug, and the tubular fishing rod section will not crack as is usually the case where these stresses are focused. By rounding the solid fiberglass plug ends, the forces exerted are distributed over a greater area.

Another object of the present invention is to provide

2 a reinforcement of the outside portion of the tubular fiberglass rod to prevent the tubular rod from splitting out. This is accomplished by utilizing a trapezoidal shaped reinforcement member that is wrapped around the tubular rod so as to feather the reinforcement member out in both directions so as to make it less noticeable and to further prevent a focusing of stress at the ends of the reinforced section.

Another object of the present invention is to provide a practical, efficient and inexpensive joint for tubular fiberglass rods which will preserve the basic principle in rod building—that of building a rod of continuous taper. The ideal rod, according to most experts, is a one-piece continuous taper. There is, however, the limit presented by the practicality of transporting such long lengths. For this reason, it is necessary to cut a rod into two or more pieces of more convenient lengths. This should be done without changing the continuous taper or the action. One object of my invention is to make it possible to have the continuous taper, feel and action of the one-piece rod, without increasing the weight appreciably, in a rod of multiple pieces.

At present, fishing and fly-casting rod joints are usually formed with interfitting metallic male and female members that are assembled and disassembled with a sliding engagement. Usually the telescoping cylindrical male and female members of such a joint are formed of drawn or machined metal tubes shaped and sized to close tolerances and of minimal thickness. Therefore, the manufacture of these close fitting metallic parts of the joint without adding weight and stiffness to the rod presents a problem and if the parts of the joint are not restricted as to length they will form a stiff non-flexing point along the rod which will greatly interfere with the action and feel deemed so necessary and desirable by many expert fishermen and tournament casters. Another present means of making a joint in fiberglass rods is to place the tip of one piece of a fiberglass shaft into the butt of another. This has the drawback of breaking the continuous taper of the rod and thus changing the desired action.

In the present invention a joint is provided for sectional fishing and casting rods which is inexpensive to manufacture and which will provide a tight joint that can be easily assembled and disassembled and further provides a degree of resilience by avoiding the stiffness that is imparted by a conventional ferrule type joint and one which will not add a bulky or unattractive appearance to the rod.

Another object of the present invention is to provide a method of making a joint or ferrule for a fiberglass tubular fishing rod made of at least two sections comprising the steps of wrapping the original fishing rod tubular fiberglass blank with a reinforcement cloth or member made of fiberglass material, before the rod blank is cured. The reinforcement member is preferably of a trapezoidal configuration and is wrapped around the outer surface of the tubular rod after which the rod blank and the reinforcement member are cured at the same time by any well-known means, not forming part of the invention, and become an integral piece. Thereafter, the rod blank is cut into two pieces in the center of the reinforced area. A solid fiberglass plug is then inserted into the section of the tubular fishing rod comprising the butt section of the rod, or the larger diameter section thereof, and this plug is secured in this butt section by gluing it or cementing it in place. The plug is disposed within the butt sections so that a substantial portion of the tapered plug extends beyond the end of the butt section. Thereafter, the tip section of the fishing rod is pressed over the projecting section of the plug to form the ferrule or joint of the fishing rod.

Various other objects and advantages of the present invention will be readily apparent from the following detailed description when considered in connection with the accompanying drawing forming a part hereof and in which:

FIG. 1 is a view of the assembled joint embodying the present invention;

FIG. 2 is a section taken along the lines 2—2 of FIG. 1;

FIG. 3 illustrates a step in the method of forming the ferrule embodying the present invention, and FIG. 4 is a view of the solid fiberglass plug embodied in the present invention;

FIG. 5 is a more or less diagrammatic view of the reinforced member for wrapping around the blank rod, illustrating it cut across the grain with the majority of fibers disposed to extend transversely of the longitudinal axis of the rod when wrapped around the rod.

Referring to the drawing, the reference numeral 10 generally designates a fishing rod, comprising a butt section 12 and a tip section 14. The butt section is of larger diameter than the tip section 14 and it will be noted that the section 12 as well as the tip section 14 are progressively tapered in a direction toward the fishing line end of the rod. Both sections are made of fiberglass material and are of tubular configuration.

Referring to FIG. 3, the tubular fiberglass rod blank 10 is shown before it is formed into the individual butt and tip sections 12 and 14, as shown in FIG. 1. In forming the joint or ferrule of the present invention, the uncured fiberglass tubular blank 16 is provided with a reinforcement member made of fiberglass cloth and designated 18. The fiberglass cloth is preferably of a trapezoidal shaped configuration when it is laid flat as best seen in FIG. 3. However, if desired, the flat reinforcement member 18 could also be triangular in shape as indicated in dotted lines in FIG. 3. The member is of sufficient size so that it can be wrapped around the blank 16 at least two times, as best seen in FIG. 2. The reinforcement member is also of sufficient size so that its width in the direction of the longitudinal axis of the blank 16 is sufficient to cover and provide the enlarged reinforcement area adjacent the finished ferrule or joint of the fishing rod. The angle indicated as 20 in FIG. 3 is larger than the angle indicated at 22 in FIG. 3 so that the fiberglass blank 16 which is tapered can be wrapped with the reinforcement member 18. Since the blank is smaller at the tip end of the rod than at the butt end, if these angles are of the same size, more reinforcement would be added at the reinforcement member nearer the tip than at the other end.

The reinforcement member 18 is wrapped around the blank 16 until it assumes the configuration shown in FIG. 1 which is that of a cylinder with beveled or feathered ends. It will be noted, as best seen in FIG. 5, the member 18 is cut across the grain so that the majority of fibers extend transversely of the longitudinal axis of blank 16 when wrapped therearound. Thereafter, the blank 16 and the wrapped reinforcement member 18 are cured by any well known means at the same time in this wrapped position until they become an integral piece. Thereafter, the rod blank and the reinforcement is completely cut through as indicated by the reference numeral 24 between the intermediate ends of the reinforcement member. Thus, the cutting of this rod blank and its integral reinforcement member severs the butt section 12 from the tip section 14 so as to constitute two separate rod sections. Thereafter, a solid fiberglass bar or plug 26 is inserted in the butt section 12 and is cemented or glued therein with a substantial portion 28 extending out or beyond the edge of the butt section adjacent the end 24 thereof. The solid fiberglass plug has a tapered surface 30 with the ends of the plug being rounded as indicated at 32 and 34. It is also to be noted that the taper of the plug is progressively smaller toward the portion 28 of the plug that is to be inserted within the rear end of the tip section 14.

After the plug has been secured with its rear portion or end 36 in the front end of the butt section 12, the rod is assembled by inserting the rear end of the tip section 14 over the portion 28 of the plug.

From the foregoing description, it is apparent that the present invention provides a ferrule or joint for a tubular fiberglass fishing rod comprising at least two separate sections in which the joint is provided with a trapezoidal reinforcement member made of fiberglass cloth wrapped around the tubular fishing rod blank and cured so as to form an integral part of the fishing rod blank with a solid bar or plug of fiberglass material having a tapered cylindrical outer surface adjacent its midportion with rounded ends. The larger diameter end of the plug is glued or cemented to the front end of the butt section while the other smaller end of the plug is readily adapted to receive the rear end of the tip section.

With this construction, the hollow fiberglass fishing rod tube will not crush and the ferrule will not break. Since the solid fiberglass plug is provided within the mating sections, the plug will not crush and the plug further will not split out the ends of the tubular sections of the fiberglass fishing rod within which it is disposed. The solid fiberglass plug gives the needed flexibility and the compression strength needed at the ferrule or joint of the fishing rod. The curve of the ends of the fiberglass plug more uniformly and evenly distributes the forces over a greater area while the reinforcement member on the outside portion of the tubular rod tube at the joint prevents the rod from splitting out. The beveled or feathered ends of the cylindrically-shaped reinforcement member as shown in FIGS. 1 and 2 further feathers the reinforcement out in both directions so as to make it less noticeable on the fishing rod and prevents focussing of stress at the ends of this reinforced section.

Inasmuch as various changes may be made in the form, location and relative arrangement of the several parts of the invention, and in the steps of making the joint of the present invention, it will be understood that the invention is not to be limited except by the scope of the appended claims.

What is claimed is:

1. A fishing rod with at least two tapered fiberglass tubular sections having confronting ends and a joint for connecting said sections at said confronting ends said joint comprising:

(a) flexible reinforcement members, wherein one of said reinforcement members is positioned on each section adjacent the confronting end of said section, said reinforcement members being of sufficient size so their width, taken together, in the direction of the longitudinal axis of said rod is suffiicent to cover and provide an enlarged reinforcement area adjacent said joint, said reinforcement members comprising an annular circumferentially split cylinder having two turns of fiberglass cloth said cloth having a trapezoidal shape with the majority of the fibers extending circumferentially around said rod transverse the axis thereof, said circumferentially split cylinder having feathered ends integral with said rod and said circumferentially extending split being positioned midway intermediate the ends of said cylinder;

(b) a solid bar plug having rounded ends inserted in one of said confronting ends of one section and permanently secured thereto, said plug extending beyond the edge of said one end and the other section having its confronting end press fitted over said extending end, the actual area of contact of said plug with said rod sections between the rounded ends of said plug is less than the area of contact of said reinforcement members as measured along the longitudinal axis of said rod.

2. The rod of claim 1 wherein said plug is of fiberglass and has a longitudinally tapered section with rounded ends.

References Cited

UNITED STATES PATENTS

| | | | |
|---|---|---|---|
| 3,416,255 | 12/1968 | Johnson | 43—18 |
| 2,390,039 | 11/1945 | Slayter et al. | 43—18GF |
| 2,536,388 | 1/1951 | Murray | 287—126XR |
| 2,742,931 | 4/1956 | De Ganahl | 43—18GF |
| 2,787,484 | 4/1957 | Macy | 43—18XR |
| 3,235,289 | 2/1966 | Jones | 285—423XR |
| 3,310,903 | 3/1967 | Binvignat | 43—18GF |
| 3,351,365 | 11/1967 | Bickl | 287—127 |
| 3,436,857 | 4/1969 | Johnson et al. | 43—18 |

FOREIGN PATENTS

| | | | |
|---|---|---|---|
| 115,947 | 1/1930 | Austria | 285—293 |

DAVID J. WILLIAMOWSKY, Primary Examiner

A. V. KUNDRAT, Assistant Examiner

U.S. Cl. X.R.

43—18; 285—293